2,874,131
Patented Feb. 17, 1959

2,874,131

ANION-EXCHANGE RESINS CONTAINING SULFONIUM GROUPS AND PROCESSES FOR MAKING THEM

Jesse C. H. Hwa, Levittown, Pa., assignor to Rohm & Haas Company, Philadelphia, Pa., a corporation of Delaware No Drawing. Application April 13, 1956
Serial No. 577,960

9 Claims. (Cl. 260—2.1)

This invention relates to the production of moderately to strongly basic anion-exchange resins which contain sulfonium groups and may or may not contain additional quaternary ammonium groups as their functional anion-exchanging groups. It is particularly concerned with the novel anion-exchange resins themselves and also with the processes for producing them. The anion-exchange resins of the present invention are useful in the deionization of fluids and as catalysts in chemical reactions requiring an alkaline catalyst.

Heretofore, it has been suggested to produce ion-exchange resins by a condensation reaction involving an aldehyde and especially formaldehyde with tertiary sulfonium compounds having at least one aryl radical attached to the sulfur atom. Products thereby obtained develop coloration in the aqueous fluid media in which they are used. They have a relatively low ion-exchange and salt-splitting capacity, based on the weight of the material of which they are composed, and it is difficult to get granular forms of the resins. The production of granules from such material involves a pulverizing or crushing action of mechanical character and entails considerable loss of the resin as fines.

In a copending application, Serial No. 562,945, filed on February 2, 1956, there is disclosed the production of anion-exchange resins containing sulfonium groups by reacting an organic sulfide, such as dimethyl sulfide, with a haloalkylated cross-linked, insoluble copolymer of a monovinyl aromatic hydrocarbon with a polyvinyl monomer. The process of that application produces addition polymers in which the sulfonium group is linked to the backbone or chain of the polymer by a linkage containing an aryl group. The resins obtained in that application are superior to the condensation type of resins containing sulfonium groups in respect to their ion-exchange capacity, the ease of obtaining the resin in granular form, and freedom from coloration of the aqueous media in which they are used.

In accordance with the present invention, anion-exchange resins containing sulfonium groups are prepared by the addition copolymerization of a vinyl sulfide with a cross-linking agent and then alkylating the sulfide groups to sulfonium groups. The anion-exchange resins thereby obtained are easily formed in granular condition, they are free of any tendency to form coloration of aqueous media, and they have from 2 to 4 times the ion-exchange capacity of the condensation type of sulfonium resins heretofore produced, based on unit weights of the resins.

The ion-exchange resins of the present invention contain as the distinctive functional exchanging group a plurality of groups or units having the structure of Formula I:

(I)    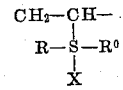

where R is selected from the group consisting of hydrocarbon groups having 1 to 18 carbon atoms including cyclohexyl, aryl, such as phenyl, and p-chlorophenyl, and alkaryl, such as tolyl and xylyl, aralkyl, such as benzyl, methylbenzyl, α-methylbenzyl, and butylbenzyl, saturated and unsaturated aliphatic hydrocarbon groups having 1 to 18 carbon atoms such as allyl, methallyl, and alkyl, such as methyl, ethyl, propyl, isopropyl, n-butyl, isobutyl, t-butyl, sec-butyl, amyl and its isomeric forms, hexyl, octyl, dodecyl, and octadecyl, hydroxyalkyl groups having 1 to 18 carbon atoms, such as β-hydroxyethyl, β-hydroxypropyl, γ-hydroxypropyl, alkoxyethyl groups having 1 to 18 carbon atoms such as methoxyethyl, ethoxyethyl, propoxyethyl, isopropoxyethyl, and butoxyethyl, and β- and γ-alkoxypropyl groups having 1 to 18 carbon atoms, such as β-ethoxypropyl and γ-methoxypropyl, X is OH or a negative, salt-forming atom or radical, such as a halogen selected from the group consisting of chlorine, bromine, and iodine, alkyl sulfate, such as methosulfate, ethosulfate, alkyl phosphate, such as methyl phosphate, dimethyl phosphate, and the tosyl radical (p-toluenesulfonate), and $R^0$ is selected from the group consisting of hydrocarbon groups having 1 to 18 carbon atoms including cyclohexyl, aralkyl groups, such as benzyl, saturated and unsaturated aliphatic hydrocarbon groups having 1 to 18 carbon atoms, such as alkyl groups, especially alkyl groups having from 1 to 4 carbon atoms, allyl, substituted allyl such as methallyl, dodecylallyl, dodecenyl, and alkaryl groups, such as alkylbenzyl, such as octylbenzyl.

The preferred resins for most purposes are those in which R and $R^0$ are of relatively small size, such as from 1 to 4 carbons in each. Specifically, the preferred resins are those in which R and $R^0$ are alkyl groups having from 1 to 4 carbon atoms. By making the size of the substituents R and $R^0$ small, the resins have a minimum weight for a given number of sulfonium groups and provide the most efficient and economical operation. For the same reason, X is preferably of small size and advantageously it is one of the halogens mentioned hereinabove.

The new ion-exchanging resins are obtained by copolymerizing a cross-linking monomer which contains two or more non-conjugated ethylenic points of unsaturation with a vinyl sulfide of the structure of Formula II:

(II)    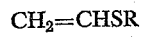

where R is the same as defined hereinbefore.

Examples of vinyl sulfides of Formula II include methyl vinyl sulfide, ethyl vinyl sulfide, propyl vinyl sulfide, isopropyl vinyl sulfide, n-butyl vinyl sulfide, isobutyl vinyl sulfide, sec-butyl vinyl sulfide, t-butyl vinyl sulfide, β-hydroxyethyl vinyl sulfide, 3-hydroxypropyl vinyl sulfide, β-hydroxy-α-methylethyl vinyl sulfide, and 5-hydroxypentyl vinyl sulfide.

Examples of cross-linking monomers containing two or more non-conjugated points of ethylenic unsaturation or two or more non-conjugated groups of the structure $CH_2=C=$ include divinylbenzene, which is ordinarily preferred because of its availability, convenience, and low cost; divinyltoluene, trivinylbenzene, divinylnaphthalene, diallyl phthalate, ethylene glycol diacrylate or dimethacrylate, divinylxylene, divinylethylbenzene, divinyl ether, divinyl sulfone, allyl ethers of polyhydric compounds such as of glycerol, pentaerythritol resorcinol, etc., divinylketone, divinylsulfide, allyl acrylate, diallyl maleate, diallyl fumarate, diallyl phthalate, diallyl succinate, diallyl carbonate, diallyl malonate, diallyl oxalate, diallyl adipate, diallyl sebacate, diallyl tartrate, diallyl silicone, diallyl silicate, triallyl tricarballylate, triallyl aconitate, triallyl citrate, triallyl phosphate, N,N'-methylenediacrylamide, N,N'-methylenedimethacrylamide, N,N'-ethylidenediacrylamide, 1,2-di(α-methylmethylenesulfonamido)-ethylene, and so on.

As little as 0.5% of the cross-linking agent, on a molar basis, has a cross-linking effect as evidenced by decreased solubility, and as much as 50%, on the same basis, has been used. It is, however, preferred to employ from about 1% to about 20% of the polyvinyl cross-linker, on a molar basis.

The mixtures of the vinyl sulfide and the monomeric polyvinyl cross-linking agent can be polymerized in bulk, in solution, in aqueous suspension, or in aqueous emulsion. For purposes of this invention, it is much preferred that the mixtures be polymerized in aqueous suspension because this leads to the formation of the insoluble copolymers in the shape of small beads or spheroids. Such resinous particles retain their shape throughout the reaction with the alkylating agents; and the resultant ion-exchange resins are in an ideal form for use in ion-exchange processes.

When the monomers have some water-solubility as in the case of hydroxyethyl vinyl sulfide and it is desired to produce granular copolymers by a suspension polymerization procedure, the medium used is an aqueous brine.

The copolymerization of all of the monomeric mixtures is carried out at any convenient temperature. But, since heat and catalysts accelerate such polymerizations, it is preferred to carry out this step at temperatures above 50° C. in the presence of a catalyst of the free radical type. When copolymerization is carried out in aqueous suspension, temperatures above 50° C. and up to the boiling point of the reaction mixture can be employed. Temperatures from about 60° C. to about 90° C. are, however, recommended.

Suitable catalysts for the copolymerization are those customarily used to accelerate polymerizations of the vinyl or addition type. Typical of such catalysts are the following: α,α'-azoisobutyronitride, dimethylazobisisobutyrate, 2,2'-azobis-2,4-dimethylvaleronitrile, benzoyl peroxide, acetyl peroxide, lauroyl peroxide, tert-butyl hydroperoxide, di-tert-butyl peroxide, tert-butyl perbenzoate, stearoyl peroxide, cumene hydroperoxide, and "per-salts" such as ammonium persulfate and ammonium perborate. The catalysts are used in amounts from 0.2% to 5%, and preferably from 0.5% to 2%, based on the weight of the copolymerizable compounds.

If desired, copolymers may be produced containing, besides the cross-linking agent and the polymerized vinyl sulfide units, units obtained from one or more additional monoethylenically unsaturated compounds, such as vinyl chloride, vinylidene chloride, styrene, acrylonitrile, ethylene, isobutylene, ureidoethyl vinyl ether and monomers containing t-amine groups, such as β-dimethylaminoethyl acrylate or methacrylate, N-(β-diethylaminoethyl)acrylamide or methacrylamide, 2-vinylpyridine, 4-vinylpyridine, and so on. Ordinarily, it is preferred to omit any additional comonomer of this latter group unless it is desired to introduce into the anion-exchange resins quaternary ammonium groups to provide additional anion-exchange groups in the copolymer. For this purpose, the copolymer may be prepared from a mixture of from 1 to 49 parts by weight of a vinyl sulfide and from 49 to 1 part by weight of at least one comonomer containing tertiary amine groups in conjunction with from 0.5 part to 50 parts by weight, but preferably only from 0.5 to 15 parts by weight, of a cross-linking agent. When a copolymer is produced containing not only the sulfide groups but the tertiary amine groups, the subsequent alkylation converts these respective groups in the copolymer into sulfonium and quaternary ammonium groups, and, by this procedure, it is possible to vary the basicity of the copolymer within wide limits. Generally, the sulfonium groups in the resins are strongly basic, but their basicity may be reduced by appropriate selection of the substituents R and R⁰, the larger these substituents generally the greater the reduction in basicity. Also, the basicity may be altered by proper selection of the t-amine-containing comonomer. Besides the t-amine-containing monomers mentioned hereinabove, any of the t-amine-containing monomers described in copending application Serial No. 467,872, filed November 9, 1954, and in the hands of a common assignee, may be employed.

After the cross-linked copolymer is obtained, it is reacted with an alkylating agent having the structure of Formula III:

(III) 

Examples of these alkylating agents include methyl chloride, ethyl chloride, benzyl chloride, allyl chloride, substituted allyl chloride, e. g. dodecylallyl chloride, dodecenyl chlorides, alkylbenzyl chlorides, e. g. octylbenzyl chlorides (from diisobutylene), any chloromethylated aromatic-like compound, e. g. chlorobenzyl chloride, chloromethylated thiophene, chloromethylated furane, chloromethylated naphthalene, or corresponding bromides or iodides, e. g., phenoxyethyl bromide, and methyl iodide.

The alkylation step is carried out in any suitable solvent, such as water, benzene, glycol, methanol, ether, dioxane, ethylene dichloride, or mixtures thereof. The temperature may be at room temperature up to the boiling or reflux temperature of the solvent, such as from about 20° C. to 260° C. Preferably, however, a temperature of 40° to 110° C. is used and the solvent is selected to provide a reflux temperature in that range. In the case of alkylating agents which are of gaseous character, a pressure vessel or autoclave is used. A catalyst is not necessary but iodide salts are useful such as sodium iodide. Molar equivalent quantities of the alkylating agent to the sulfide units in the copolymer are used although, if desired, an excess of the alkylating agent may be used. When the resin contains t-amine groups, the alkylating agent may be introduced in sufficient amounts to provide an equivalent to the total of sulfide and t-amine units in the polymer.

The sulfonium resin may be separated by filtration, extraction with solvents to remove soluble impurities, steam distillation to remove volatile impurities, rinsings with water or other solvents, and so on.

The products of the invention are strongly basic anion-exchange resins containing sulfonium groups linked directly by the sulfur atom therein to the backbone or main chain of the polymer. The resin may also contain anion-exchange groups of quaternary ammonium type.

The resinous products are capable of exchanging the anion, represented by X above, for other anions. They are converted to any desired anionic form by treatment with a solution containing any particular anion. Furthermore, when they are in the hydroxyl form (that is, when X is OH), they are capable of splitting neutral salts, such as sodium chloride and of exchanging their hydroxyl ions for the anions of said neutral salt. They also absorb very weak acids and consequently can remove dissolved silica from aqueous solutions. They are particularly useful in so-called "mixed-bed" operations where they are mixed with a cation-exchanger and the resultant mixture is used to deionize fluids. The ease with which the resins can be regenerated, such as by the addition of caustic soda, makes them particularly useful in industrial applications.

In the following examples, the parts and percentages are by weight unless otherwise noted:

*Example 1*

(a) In a glass reaction vessel equipped with a mechanical stirrer, thermometer and a reflux condenser, a mixture of 182 parts of salt, 450 parts of water, 29 parts of a 3% aqueous suspension of a poly(magnesium silicate) sold under the trade name Eyrite, and 1 part of sodium bicarbonate is stirred thoroughly. While stirring a solution of 197 parts of 2-hydroxyethyl vinyl sulfide, 18 parts of commercial divinylbenzene (inhibitor removed by caustic washes) and 2.2 parts of dimethyl azo-bis-iso-butyrate is added. The stirring rate is so adjusted that the monomer droplets range in diameter from 0.2 to 0.4 mm. Nitrogen gas is introduced into the flask and maintained throughout the polymerization. The mixture is heated and maintained at 80° C. to 85° C. for 8 hours.

The hardened beads are isolated by filtration, washed thoroughly in succession with water, dimethylformamide, and finally water to free it from soluble material. The wet resin is dried in a 105° to 110° C. oven. One hundred and forty-two parts of dry granules (4.6% divinylbenzene cross-linked resin) are obtained, corresponding to 66% yield. The resin has 26.4% sulfur by analysis.

(b) A mixture of 60 parts of the resin prepared by the method described above, 25 parts of ethylene dichloride, 50 parts of ethylene glycol, 200 parts of water, and 1 part of sodium iodide is stirred in an autoclave. The autoclave is flushed with methyl chloride gas and then charged with the gas at 60° to 68° p. s. i. g. The contents are heated to 85° to 95° C. for 16 hours. After cooling, the resin is removed by filtration, washed once with water and steam distilled to remove ethylene dichloride. The hydrophilic resin is finally washed four times with deionized water.

The product consists of 184 parts (wet) pale yellow beads. It contains 26.5% solids and has 2.70 milliequivalents per gram dry of anion-exchange capacity and 1.33 milliequivalents per gram dry of salt-splitting anion capacity.

The percentage conversion of the vinyl sulfide to the vinyl sulfonium groups may be calculated as follows:

| Monomers | Parts by weight | Mol. weight | Number of moles |
| --- | --- | --- | --- |
| 2-hydroxyethyl vinyl sulfide | 197 | 104 | 1.89 |
| Divinylbenzene | 18 | 130 | 0.14 |
| | | | 2.03 |

Mole percent of the vinyl sulfide is 1.89/2.03 or 93 percent.

Mole percent of divinylbenzene is 0.14/2.03 or 7 percent.

∴Mole ratio of the vinyl sulfide:divinylbenzene is 93/7 percent.

If the intermediate is completely converted to sulfonium units, the results would be as follows:

| | Parts by weight | Mol. weight | Number of moles |
| --- | --- | --- | --- |
| Vinyl sulfide | 0 | | |
| Vinyl sulfonium units | 290 | 154 | 1.89 |
| Divinylbenzene | 18 | 130 | 0.14 |
| | 308 | | |

The theoretical anion-exchange capacity then would be:

$$\frac{1.89 \text{ mole} \times 1000}{308}\text{g.} = 6.15 \text{ meq./g.}$$

However, since the actual capacity was found to be 2.70 meq./g., the percentage conversion of the vinyl sulfide to vinyl sulfonium units amounted to:

$$2.70/6.15 = 44\%$$

The proportion of unreacted vinyl sulfide is, therefore:

$$0.44 \times 93 = 41\%$$

The final mole ratio of the finished product and the percentage conversion of sulfide to sulfonium units may be summarized as follows:

Mole percent of the vinyl sulfide _____ 93
Mole percent of divinylbenzene _____ 7

Vinyl sulfide (unreacted) _____ 52
Vinyl sulfonium units _____ 41
Divinylbenzene _____ 9
Percentage conversion (41/93) _____ 44

(c) The procedure of part (a) hereof is repeated substituting for the 2-hydroxyethyl vinyl sulfide and the divinylbenzene monomers several different mixtures of monomers as follows:

(1) 180 parts of methyl vinyl sulfide and 15 parts of divinyltoluene;
(2) 220 parts of 5-hydroxypentyl vinyl sulfide and 12 parts of diethylene glycol dimethacrylate;
(3) 210 parts of methoxyethyl vinyl sulfide and 10 parts of trivinylbenzene;
(4) 225 parts of benzyl vinyl sulfide and 20 parts of N,N'-methylene-dimethacrylamide;
(5) 100 parts of methyl vinyl sulfide, 80 parts of β-dimethylaminoethyl methacrylate and 15 parts of divinylbenzene.

Strongly basic anion-exchange resins are obtained having capacities similar to those obtained in the resin of part (b) hereof, and in the case of the fifth mixture the basicity of the anion-exchange resin was even greater than that of the others.

*Example 2*

A 10% divinylbenzene-2-hydroxyethyl vinyl sulfide resin is prepared by a method similar to that described in Example 1(a) above. The resin contains 21.4% sulfur. A mixture of 144 parts of this intermediate, 500 parts of water and 1 part of sodium iodide is heated with methyl chloride gas at 65° to 85° p. s. i. g. and 98° C. for 24 hours. The resin is isolated and washed thoroughly with water. Two hundred and forty-nine parts of the product are obtained. It has 50.7% solids, 2.06 and 0.66 milliequivalents per gram dry and per ml. wet of anion-exchange capacities respectively, and 0.66 and 0.21 milliequivalents per gram dry and per ml. wet of salt-splitting anion-capacities respectively.

The final mole ratio of the finished product, and the percentage conversion of sulfide to sulfonium units, both calculated as set forth in Example 1, may be summarized as follows:

Mole percent of the vinyl sulfide _____ 90
Mole percent of divinylbenzene _____ 10

Vinyl sulfide (unreacted) _____ 59
Vinyl sulfonium units _____ 31
Divinylbenzene _____ 10
Percentage conversion (31/90) _____ 34

*Example 3*

(a) A mixture of 12 parts of the resin described in Example 1(a), 100 parts of water and 14 parts of n-butyl bromide is heated to reflux for 8 hours. The granules are washed with ethanol and then with water. The product weighs 20 parts. It has 44.6% solids, 8.4% bromide (dry basis), 1.69 milliequivalents per gram dry of anion-exchange capacity and 0.70 milliequivalent per gram dry of salt-splitting anion capacity.

The final mole ratio of the finished product, and the percentage conversion of sulfide to sulfonium units, both calculated as set forth in Example 1, may be summarized as follows:

| | |
|---|---|
| Mole percent of the vinyl sulfide | 93 |
| Mole percent of divinylbenzene | 7 |
| | |
| Vinyl sulfide (unreacted) | 54 |
| Vinyl sulfonium units | 39 |
| Divinylbenzene | 7 |
| Percentage conversion (39/93) | 42 |

(b) The procedure of part (a) is repeated in successive runs replacing the n-butyl bromide with a molarly equivalent amount of benzyl chloride, allyl chloride, and methyl sulfate respectively. Strongly basic anion-exchange resins containing sulfonium groups were thereby produced.

(c) Two other strongly basic anion-exchange resins are obtained by the procedure of part (a) hereof, replacing the n-butyl bromide with ethyl chloride in one instance and ethyl bromide in another.

*Example 4*

(a) A mixture of 5 parts of n-butyl vinyl sulfide, 0.5 part of commercial divinylbenzene (inhibitor removed by caustic washes), 0.02 part of azo-bis-isobutyronitrile is heated in bulk under nitrogen atmosphere at 70° C. for 8 hours. The hardened material is broken up into small granules, extracted with ethylene dichloride and dried. It is reacted with methyl chloride in the same manner described in Example 2. The product has 0.48 milliequivalents per gram dry of salt-splitting anion capacity.

The final mole ratio of the finished product, and the percentage conversion of sulfide to sulfonium units, both calculated as set forth in Example 1, may be summarized as follows:

| | |
|---|---|
| Mole percent of the vinyl sulfide | 91 |
| Mole percent of divinylbenzene | 9 |
| | |
| Vinyl sulfide (unreacted) | 83 |
| Vinyl sulfonium units | 8 |
| Divinylbenzene | 9 |
| Percentage conversion (8/91) | 9 |

(b) The procedure of part (a) is repeated replacing the n-butyl vinyl sulfide with a molar equivalent weight of methyl vinyl sulfide. A highly efficient anion-exchange resin is obtained.

(c) The procedure of part (b) is repeated substituting a mixture of 4 parts of methyl vinyl sulfide with 2 parts of 4-vinylpyridine.

(d) The procedure of part (b) is repeated substituting a mixture of 4 parts of ethyl vinyl sulfide and 1 part of 2-vinylpyridine.

It is to be understood that changes and variations may be made without departing from the spirit and scope of the invention as defined in the appended claims.

I claim:

1. The —S— alkylated copolymer formed from about 7–10 molar percent of a crosslinking agent containing at least two non-conjugated points of ethylenic unsaturation and about 90–93 molar percent of vinyl sulfide, said copolymer having about 9–44 molar percent of its

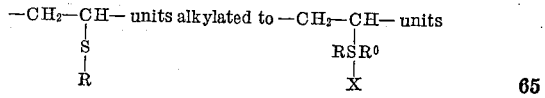

where R is selected from the group consisting of hydrocarbon groups having 1 to 5 carbon atoms, hydroxyalkyl groups having 1 to 5 carbon atoms, alkoxyethyl groups having 1 to 5 carbon atoms, and β- and γ-alkoxypropyl groups having 1 to 5 carbon atoms, R⁰ is selected from the group consisting of hydrocarbon groups having 1 to 5 carbon atoms, and X is selected from the group consisting of OH and a negative salt-forming member.

2. The copolymer of claim 1 in which R is a β-hydroxyethyl group, and R⁰ is a methyl group.

3. The copolymer of claim 1 in which R is a β-hydroxyethyl group, and R⁰ is an n-butyl group.

4. The copolymer of claim 1 in which R is an n-butyl group, and R⁰ is a methyl group.

5. The copolymer of claim 1 in which R is a methyl group, and R⁰ is a methyl group.

6. The copolymer of claim 1 in which R is an ethyl group, and R⁰ is a methyl group.

7. The —S— alkylated copolymer formed from about 0.5 to 15 parts by weight of a crosslinking agent containing at least two non-conjugated points of ethylenic unsaturation and a monomer mixture of from 1 to 49 parts by weight of vinyl sulfide and 49 to 1 parts by weight of a compound from the group consisting of β-dimethylaminoethyl acrylate, β-dimethylaminoethyl methacrylate, N-(β-diethylaminoethyl)acrylamide, N-(β-diethylaminoethyl)methacrylamide, 2-vinylpyridine, and 4-vinylpyridine, said copolymer having its tertiary amine groups converted into quaternary ammonium groups and its

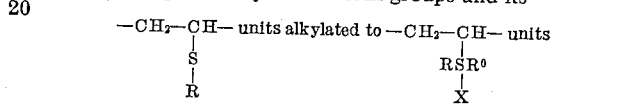

where R is selected from the group consisting of hydrocarbon groups having 1 to 5 carbon atoms, hydroxyalkyl groups having 1 to 5 carbon atoms, alkoxyethyl groups having 1 to 5 carbon atoms, and β- and γ-alkoxypropyl groups having 1 to 5 carbon atoms R⁰ is selected from the group consisting of hydrocarbon groups having 1 to 5 carbon atoms, and X is selected from the group consisting of OH and a negative salt-forming member.

8. A process for making an anion-exchange resin having a crosslinking agent which contains at least two non-conjugated points of ethylenic unsaturation and also having units whose structure is of the formula

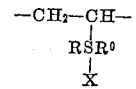

which comprises copolymerizing a mixture of monomers comprising about 7–10 molar percent of a crosslinking agent having at least two non-conjugated points of ethylenic unsaturation and about 90–93 molar percent of vinyl sulfide having the structure of the formula $$CH_2\!\!=\!\!CHSR$$

and reacting the insoluble copolymer thereby obtained with an alkylating agent of the formula R⁰X, where, in the above formulae, R is selected from the group consisting of hyrocarbon groups having 1 to 5 carbon atoms, hydroxyalkyl groups having 1 to 5 carbon atoms, alkoxyethyl groups having 1 to 5 carbon atoms, and β- and γ-alkoxypropyl groups having 1 to 5 carbon atoms, R⁰ is selected from the group consisting of hydrocarbon groups having 1 to 5 carbon atoms, and X is selected from the group consisting of OH and a negative salt-forming member.

9. A process for making an anion-exchange resin having a crosslinking agent which contains at least two non-conjugated points of ethylenic unsaturation and also having units whose structure is of the formula

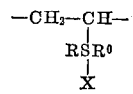

which comprises copolymerizing a mixture of monomers comprising about 7–10 molar percent of a crosslinking agent having at least two non-conjugated points of ethylenic unsaturation, about 90–93 molar percent of vinyl sulfide having the structure of the formula $CH_2\!\!=\!\!CHSR$, and an amino compound from the group consisting of β-dimethylaminoethyl acrylate, β-dimethylaminoethyl methacrylate, N-(β-diethylaminoethyl)acrylamide, N-(β-diethylaminoethyl)methacrylamide, N-(β-diethylaminoethyl)methacrylamide, 2-vinylpyridine and 4-vinylpyridine, the ratio of the said amino compound to the said vinyl sulfide ranging from 1:49 to 49:1 parts by weight, and reacting the insoluble copolymer thereby obtained with an alkylating agent of the formula $R^0X$, where, in the above formulae, R is selected from the group consisting of hydrocarbon groups having 1 to 5 carbon atoms, hydroxyalkyl groups having 1 to 5 carbon atoms, alkoxyethyl groups having 1 to 5 carbon atoms, and $\beta$- and $\gamma$-alkoxypropyl groups having 1 to 5 carbon atoms, $R^0$ is selected from the group consisting of hydrocarbon groups having 1 to 5 carbon atoms, and X is selected from the group consisting of OH and a negative salt-forming member.

References Cited in the file of this patent

UNITED STATES PATENTS

| | | |
|---|---|---|
| 2,768,990 | De Jong | Oct. 30, 1956 |
| 2,769,802 | Pritchard | Nov. 6, 1956 |

FOREIGN PATENTS

| | | |
|---|---|---|
| 562,269 | Great Britain | June 26, 1944 |